(12) United States Patent
Tsai (10) Patent No.: US 11,884,394 B2
(45) Date of Patent: Jan. 30, 2024

(54) WING ASSEMBLIES WITH TANDEMLY ACTUATED FLIGHT CONTROL SURFACES, AIRCRAFT, AND RELATED METHODS

(71) Applicant: The Boeing Company, Chicago, IL (US)

(72) Inventor: Kevin Raylin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/856,794

(22) Filed: Jul. 1, 2022

(65) Prior Publication Data

US 2024/0002038 A1 Jan. 4, 2024

(51) Int. Cl.
*B64C 9/20* (2006.01)
*B64C 9/26* (2006.01)

(52) U.S. Cl.
CPC . *B64C 9/20* (2013.01); *B64C 9/26* (2013.01)

(58) Field of Classification Search
CPC .... B64C 9/12; B64C 9/14; B64C 9/20; B64C 9/26; B64C 13/02; B64C 13/28; B64C 13/34; B64C 13/341
See application file for complete search history.

(56) References Cited

U.S. PATENT DOCUMENTS

| | | | |
|---|---|---|---|
| 4,995,575 A | 2/1991 | Stephenson | |
| 8,104,721 B2 | 1/2012 | Pohl | |
| 9,963,220 B2 | 5/2018 | Ishihara et al. | |
| 10,611,462 B2 | 4/2020 | Young | |
| 11,338,907 B2 | 5/2022 | Young | |
| 2002/0047068 A1* | 4/2002 | Uchida | B64C 13/30 244/99.3 |
| 2014/0097292 A1* | 4/2014 | Hauber | B64C 13/26 244/99.2 |
| 2015/0083852 A1* | 3/2015 | Moser | B64C 9/14 244/99.3 |

* cited by examiner

*Primary Examiner* — Richard G Davis
(74) *Attorney, Agent, or Firm* — Kolitch Romano Dascenzo Gates LLC (57) ABSTRACT

Wing assemblies (100) comprise an inboard flight control surface (102), an outboard flight control surface (104) positioned directly adjacent to and outboard of the inboard flight control surface (102), and a dual actuation assembly (106) coupled directly to and forming a linkage between the inboard flight control surface (102) and the outboard flight control surface (104). The dual actuation assembly (106) is configured to selectively transition the inboard flight control surface (102) and the outboard flight control surface (104), in tandem, amongst a retracted configuration (108) and a range of extended configurations (110).

22 Claims, 5 Drawing Sheets

WING ASSEMBLIES WITH TANDEMLY ACTUATED FLIGHT CONTROL SURFACES, AIRCRAFT, AND RELATED METHODS

FIELD

The present disclosure relates to flight control surfaces of aircraft.

BACKGROUND

Aircraft, such as airliners, often include multiples of a single type of flight control surface, such as a flap, per wing. Each such flight control surface requires its own mechanism or mechanisms to operatively transition the flight control surface into operative positions. Moreover, each such mechanism typically has a fairing associated with it. Such flight control surface mechanisms are heavy and with their fairings increase the overall drag of the aircraft.

SUMMARY

Wing assemblies comprise an inboard flight control surface, an outboard flight control surface positioned directly adjacent to and outboard of the inboard flight control surface, and a dual actuation assembly coupled directly to the inboard flight control surface and to the outboard flight control surface. The dual actuation assembly is configured to selectively transition the inboard flight control surface and the outboard flight control surface in tandem amongst a retracted configuration and a range of extended configurations. The wing assembly is configured such that the inboard flight control surface and the outboard flight control surface can only be actuated in tandem.

Methods comprise transitioning, with a dual actuation assembly that comprises a single actuator, an inboard flight control surface and an outboard flight control surface in tandem amongst a retracted configuration and a range of extended configurations.

DESCRIPTION

FIGS. 1-9 provide illustrative, non-exclusive examples of aircraft 10, wing assemblies 100, and dual actuation assemblies 106, of components thereof, and/or associated methods, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

Figure 1:
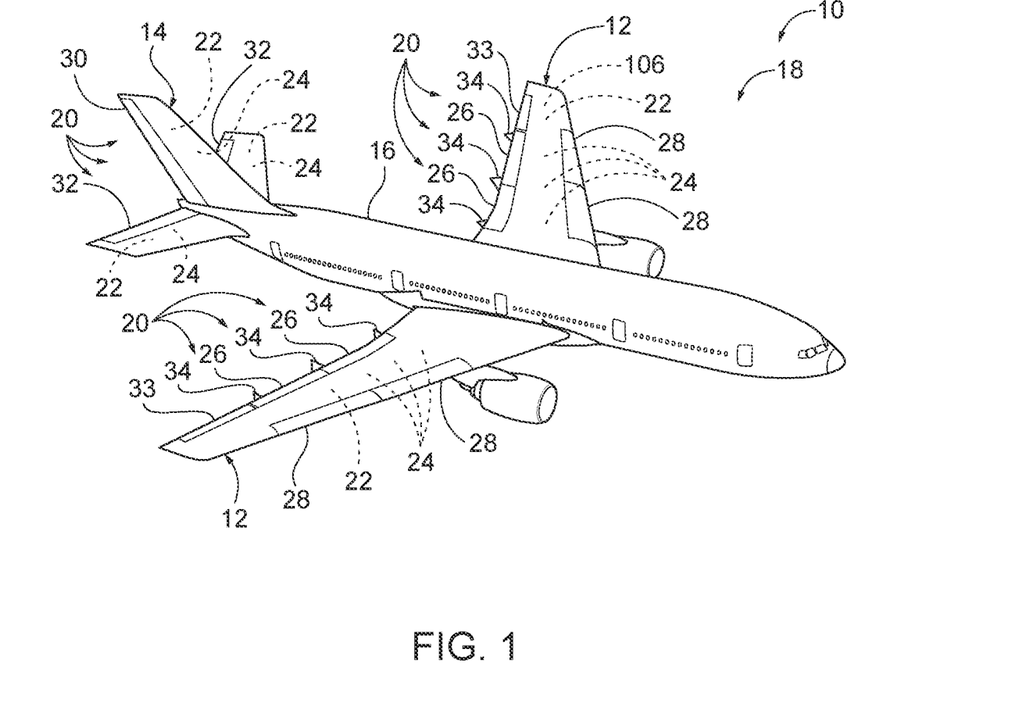
FIG. 1 is an illustration of an example aircraft.
Figure 2:
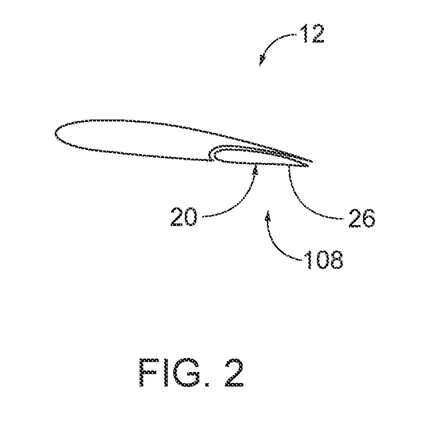
FIG. 2 is a schematic profile view of an aircraft wing with a flight control surface in a retracted configuration.
Figure 3:
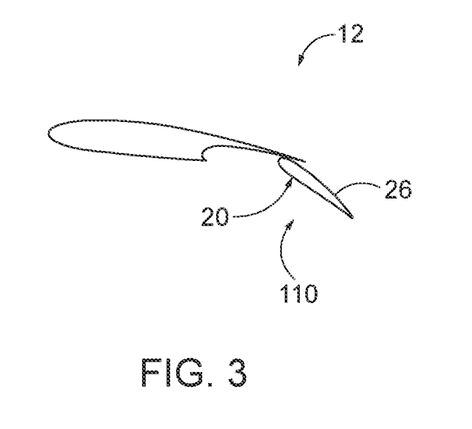
FIG. 3 is a schematic profile view of an aircraft wing with a flight control surface in an extended configuration.

FIG. 1 is a schematic representation of an aircraft 10 that may comprise wing assemblies 100 and dual actuation assemblies 106 according to the present disclosure. While aircraft 10 is depicted as a fixed-wing airliner, aircraft 10, wing assemblies 100, and dual actuation assemblies 106 according to the present disclosure are not limited to such examples, and aircraft 10 may be fixed wing aircraft, commercial aircraft, military aircraft, passenger aircraft, autonomous aircraft, rotorcraft, etc. Aircraft 10 typically include wings 12 and a tail 14 that are supported by a fuselage 16 to form and/or define an airframe 18. The wings 12 and the tail 14 include a plurality of flight control surfaces 20 that are configured to be selectively moved relative to support structures 22 of the wings 12 or the tail 14. Examples of flight control surfaces 20 include flaps 26, slats 28, rudders 30, elevators 32, spoilers, ailerons, flaperons, and Krueger flaps. Examples of support structures 22 include spars, ribs, or other underlying framework of a wing 12 or a tail 14. The flight control surfaces 20 are adapted, configured, sized, shaped, and/or designed to be selectively moved relative to a support structure 22 and actuated between a retracted configuration 108, as illustrated in FIG. 2, and a range of extended configurations 110, as illustrated in FIG. 3, using a flap 26 as an example. The retracted configuration 108 also may be described as a stowed configuration, and the extended configurations 110 also may be described as deployed configurations. Actuation of the flight control surfaces 20 changes one or more aerodynamic characteristics of the aircraft 10 in a desired manner. Actuation of the flight control surfaces 20 may be facilitated, controlled, and/or regulated by one or more actuation assemblies 24 that are supported by, or otherwise coupled to, the support structures 22. Some aircraft 10 further comprise fairings 34 associated with the actuation assemblies 24. The fairings 34 are provided to reduce aerodynamic drag that otherwise would be caused by the associated actuation assemblies 24.

Figure 4:
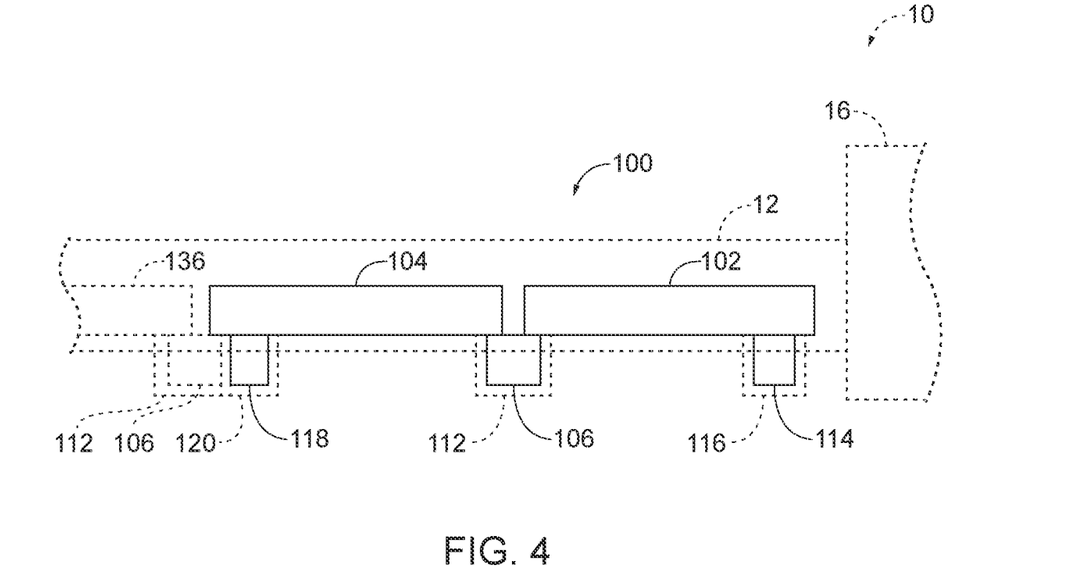
FIG. 4 is a schematic representation of example wing assemblies.

Turning now to FIG. 4, wing assemblies 100 are schematically represented. Generally, in FIG. 4, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. As shown, wing assemblies 100 generally comprise an inboard flight control surface 102, an outboard flight control surface 104 that is positioned adjacent to and outboard of the inboard flight control surface 102, and a dual actuation assembly 106 that is coupled to and that forms a linkage between the inboard flight control surface 102 and the outboard flight control surface 104. The dual actuation assembly 106 is configured to selectively transition the inboard flight control surface 102 and the outboard flight control surface 104, in tandem, amongst the retracted configuration 108 and the range of extended configurations 110. In particular, because the dual actuation assembly 106 is coupled to both the inboard flight control surface 102 and the outboard flight control surface 104, in some examples, the wing assembly 100 is configured such that the inboard flight control surface 102 and the outboard flight control surface 104 can only be actuated in tandem.

Herein, spatial terms, such as inboard, outboard, and the like, are used to describe relative positions of components. In particular an outboard flight control surface 104 of an aircraft 10 is further away from the fuselage 16 than an inboard flight control surface 102. By the outboard flight control surface 104 being described as adjacent to and outboard of the inboard flight control surface 102, it is meant that the outboard flight control surface 104 and the inboard flight control surface 102 are in close proximity next to each other without another flight control surface 20 between the two structures, but are not necessarily physically engaged with each other. For example, in aircraft 10 that include three high lift flaps per wing, including a mid-flap, an outboard-most flap is not adjacent to an inboard-most flap, because the mid-flap is positioned between the two. In such examples, the midflap may be described as an outboard flap relative to the inboard-most flap, and the mid-flap also may be described as an inboard flap relative to the outboard-most flap.

With continued reference to FIG. 4, some wing assemblies 100 further comprise an inboard actuation assembly 114 that is coupled directly to the inboard flight control surface 102 and that is configured to selectively transition the inboard flight control surface 102 amongst the retracted configuration 108 and the range of extended configurations 110 in tandem with the dual actuation assembly 106. By being coupled directly to the inboard flight control surface 102, it is meant that the inboard actuation assembly 114 is physically engaged with the inboard flight control surface 102, but it is not physically engaged with the outboard flight control surface 104. Gaskets, paint, fasteners, washers, and other operative and functional structures are considered to be part of the respective components that are physically engaged with each other. However, the inboard actuation assembly 114 may be described as also being indirectly and/or operatively coupled to the outboard flight control surface 104 via the inboard flight control surface 102 and the dual actuation assembly 106.

Similarly, some wing assemblies 100 further comprise an outboard actuation assembly 118 that is coupled directly to the outboard flight control surface 104 and that is configured to selectively transition the outboard flight control surface 104 amongst the retracted configuration 108 and the range of extended configurations 110 in tandem with the dual actuation assembly 106. Moreover, in examples that include both an inboard actuation assembly 114 and an outboard actuation assembly 118, the outboard actuation assembly 118 may be described as being configured to selectively transition the outboard flight control surface 104 amongst the retracted configuration 108 and the range of extended configurations 110 in tandem with the dual actuation assembly 106 and the inboard actuation assembly 114. That is, all three of the dual actuation assembly 106, the inboard actuation assembly 114, and the outboard actuation assembly 118, when present, collectively transition the inboard flight control surface 102 and the outboard flight control surface 104, in tandem, amongst the retracted configuration 108 and the range of extended configurations 110.

In some examples of wing assemblies 100 that comprise both an inboard actuation assembly 114 and an outboard actuation assembly 118, the inboard actuation assembly 114 and the outboard actuation assembly 118 may be at least substantially identical in construction, such as being constructed of the same component parts, sharing the same part number, having the same weight, and so forth. Minor differences, such as fastener patterns associated with adjacent structures to which the actuation assembly is configured to be coupled may differ between an inboard actuation assembly 114 and an outboard actuation assembly 118 and still be described as being at least substantially identical in construction.

The dual actuation assembly 106, the inboard actuation assembly 114, and the outboard actuation assembly 118 may be described as having a dual-actuation assembly weight, an inboard-actuation-assembly weight, and an outboard-actuation-assembly weight, respectively. In some examples, the inboard-actuation-assembly weight and the outboard-actuation-assembly weight may be less than the dual-actuation-assembly weight. In particular, while inclusion of a dual actuation assembly 106 reduces the total number of actuation assemblies needed for a pair of adjacent flight control surfaces, the dual actuation assembly 106 may be heavier than one of an otherwise used pair of actuation assemblies. However, the dual actuation assembly 106 may not be twice as heavy as a single actuation assembly that otherwise would be used as part of a pair of adjacent actuation assemblies. Accordingly, inclusion of a dual actuation assembly 106, and thus the elimination of an actuation assembly, will reduce the overall weight of the wing assembly 100 and aircraft 10. As an example, an inboard-actuation-assembly weight and an outboard-actuation-assembly weight may be 60-90% of a dual-actuation-assembly weight. Stated differently, a dual-actuation-assembly weight may be 111-167% of an inboard-actuation-assembly weight and an outboard-actuation-assembly weight.

As schematically illustrated in FIG. 4, some wing assemblies 100 further comprise a dual-actuation-assembly fairing 112 that is associated with the dual actuation assembly 106, an inboard-actuation-assembly fairing 116 associated with the inboard actuation assembly 114, and an outboard-actuation-assembly fairing 120 associated with the outboard actuation assembly 118. The dual-actuation-assembly fairing 112 may be described as having a dual-actuation-assembly-fairing wetted area, the inboard-actuation-assembly fairing 116 may be described as having an inboard-actuation-assembly-fairing wetted area, and the outboard-actuation-assembly fairing 120 may be described as having an outboard-actuation-assembly-fairing wetted area. In some examples, the inboard-actuation-assembly-fairing wetted area and the outboard-actuation-assembly-fairing wetted area may be less than the dual-actuation-assembly-fairing wetted area. In particular, while inclusion of a dual actuation assembly 106 reduces the total number of actuation assemblies, and thus the total number of associated fairings, needed for a pair of adjacent flight control surfaces, the dual-actuation-assembly-fairing 112 may have a wetted area that is larger than one of an otherwise used pair of actuation assembly fairings. However, the dual-actuation-assembly-fairing wetted area may not be twice as great as a single actuation-assembly fairing that otherwise would be used as part of a pair of adjacent actuation assembly fairings. Accordingly, inclusion of a dual-actual-assembly fairing 112, and thus the elimination of an actuation-assembly fairing, will reduce the overall wetted areas, and thus the drag, associated with the fairings. As an example, an inboard-actuation-assembly-fairing wetted area and an outboard-actuation-assembly-assembly-fairing wetted area may be 60-90% of a dual-actuation-assembly-fairing wetted area. Stated differently, a dual-actuation-assembly-fairing wetted area may be 111-167% of an inboard-actuation-assembly-fairing wetted area and an outboard-actuation-assembly-fairing wetted area.

Figure 5:
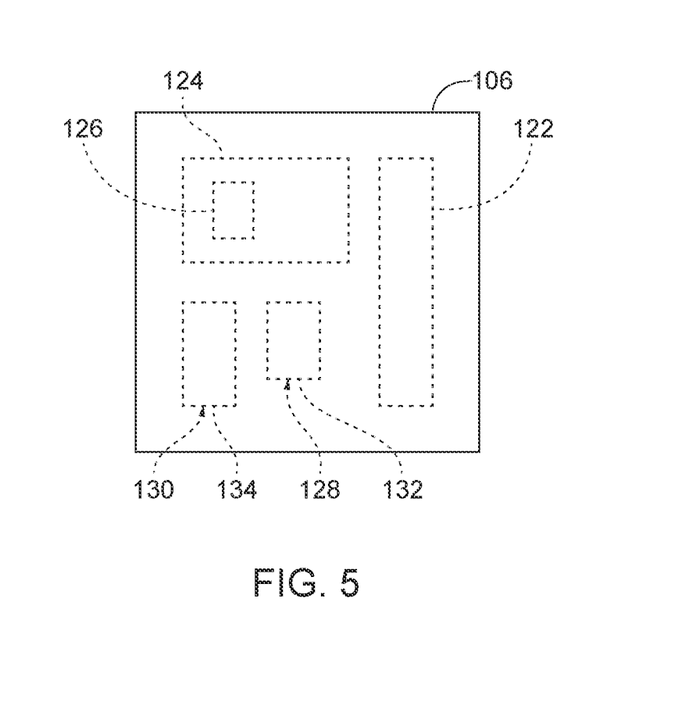
FIG. 5 is a schematic representation of example dual actuation assemblies.

Turning now to FIG. 5, a dual actuation assembly 106 for, or of, a wing assembly 100 may comprise a frame 124, a single actuator 122 supported by the frame 124, an inboard carrier beam 128, and an outboard carrier beam 130. The inboard carrier beam 128 is pivotally coupled relative to the frame 124 and is configured to be operatively coupled between the single actuator 122 and an inboard flight control surface 102. Similarly, the outboard carrier beam 130 is pivotally coupled relative to the frame 124 and is configured to be operatively coupled between the single actuator 122 and an outboard flight control surface 104. The frame 124 comprises a mount 126 that is configured to be coupled to a wing support structure 22 of a wing 12. The single actuator 122 may be a linear actuator or a rotary actuator, but notably only a single actuator 122 is included, as the inboard flight control surface 102 and the outboard flight control surface 104 are transitioned, in tandem, amongst a retracted configuration 108 and a range of extended configurations 110.

In some examples, and as schematically represented in FIG. 5, the outboard carrier beam 130 has an outboard-carrier-beam distal end 134 (i.e., distal relative to the mount 126) that is farther from the mount 126 than an inboard-carrier-beam distal end 132 of the inboard carrier beam 128. In some examples, the outboard carrier beam 130 may be longer than the inboard carrier beam 128. Such configurations of dual actuation assemblies 106 are operable for use in aircraft 10 with swept wings, where an outboard flight control surface necessarily is going to be positioned at least partially aft of an adjacent inboard flight control surface.

Returning briefly to FIG. 4, wing assemblies 100 are not limited to having only a single inboard flight control surface 102, a single outboard flight control surface 104, and a single dual actuation assembly 106. Rather, as schematically illustrated and also represented in FIG. 1, a third flight control surface 136, which also may be described as a second outboard flight control surface 136, may be positioned adjacent to and outboard of the outboard flight control surface 104, with a dual actuation assembly 106 operatively coupled to the outboard flight control surface 104 and to the third flight control surface 136. More than three flight control surfaces and more than two dual actuation assemblies also may be included in a wing assembly 100 according to the present disclosure.

Also within the scope of the present disclosure are methods of operating an aircraft 10. Such methods comprise, with a dual actuation assembly 106 comprising a single actuator 122, transitioning an inboard flight control surface 102 and an outboard flight control surface 104, in tandem, amongst a retracted configuration 108 and a range of extended configurations 110.

Turning now to FIGS. 6-9, an illustrative non-exclusive example of a wing assembly 100 in the form of wing assembly 200 is illustrated. Where appropriate, the reference numerals from the schematic illustrations of FIGS. 1-5 are used to designate corresponding parts of wing assembly 200; however, the example of FIGS. 6-9 is non-exclusive and does not limit wing assemblies 100 to the illustrated embodiment of wing assembly 200. That is, wing assemblies 100 are not limited to the specific embodiment of the illustrated wing assembly 200, and wing assemblies 100 may incorporate any number of the various aspects, configurations, characteristics, properties, etc. of wing assemblies 100 that are illustrated in and discussed with reference to the schematic representations of FIGS. 1-5 and/or the embodiment of FIGS. 6-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to wing assembly 200; however, it is within the scope of the present disclosure that the previously discussed features, variants, etc. may be utilized with wing assembly 200.

Figure 6:
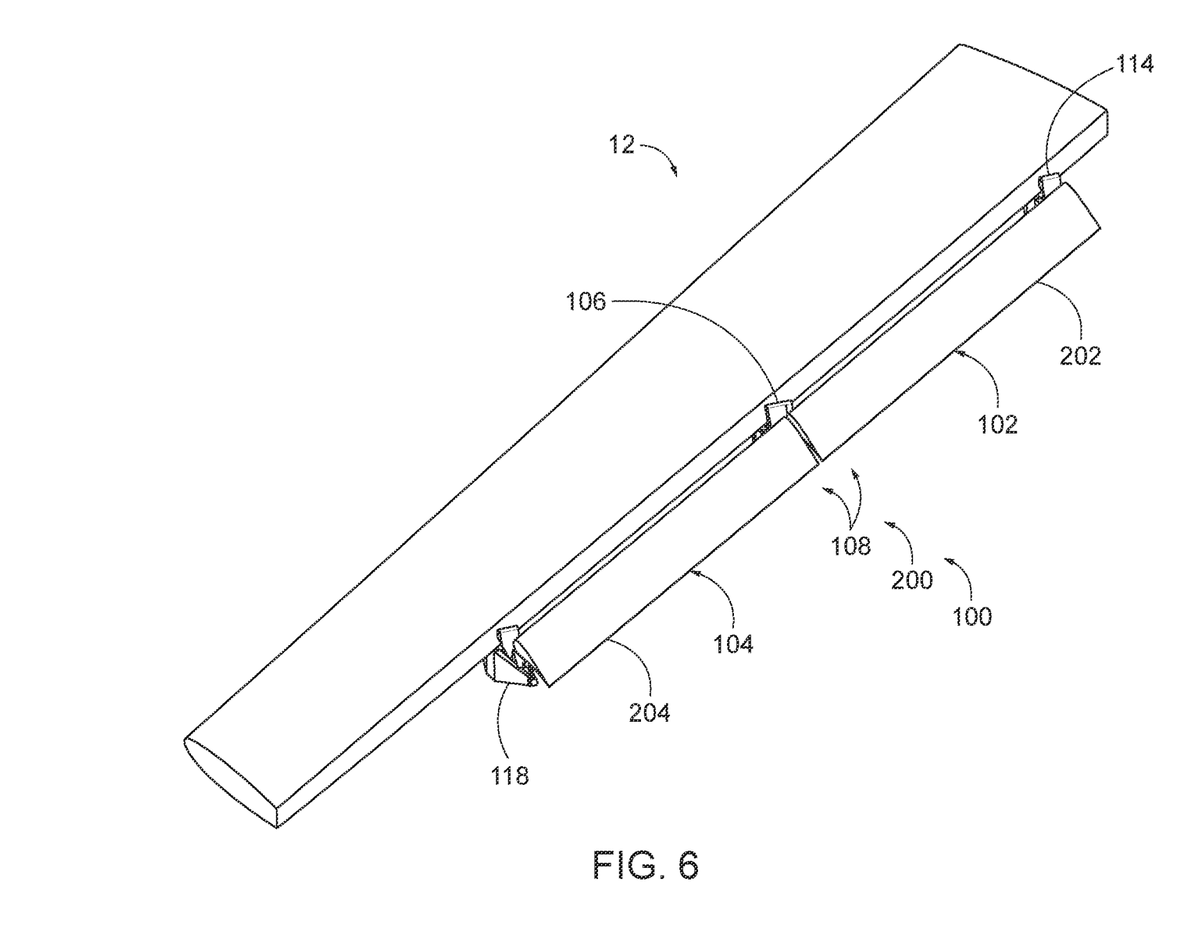
FIG. 6 is a perspective view of an example wing assembly with two flaps in a retracted configuration.
Figure 7:
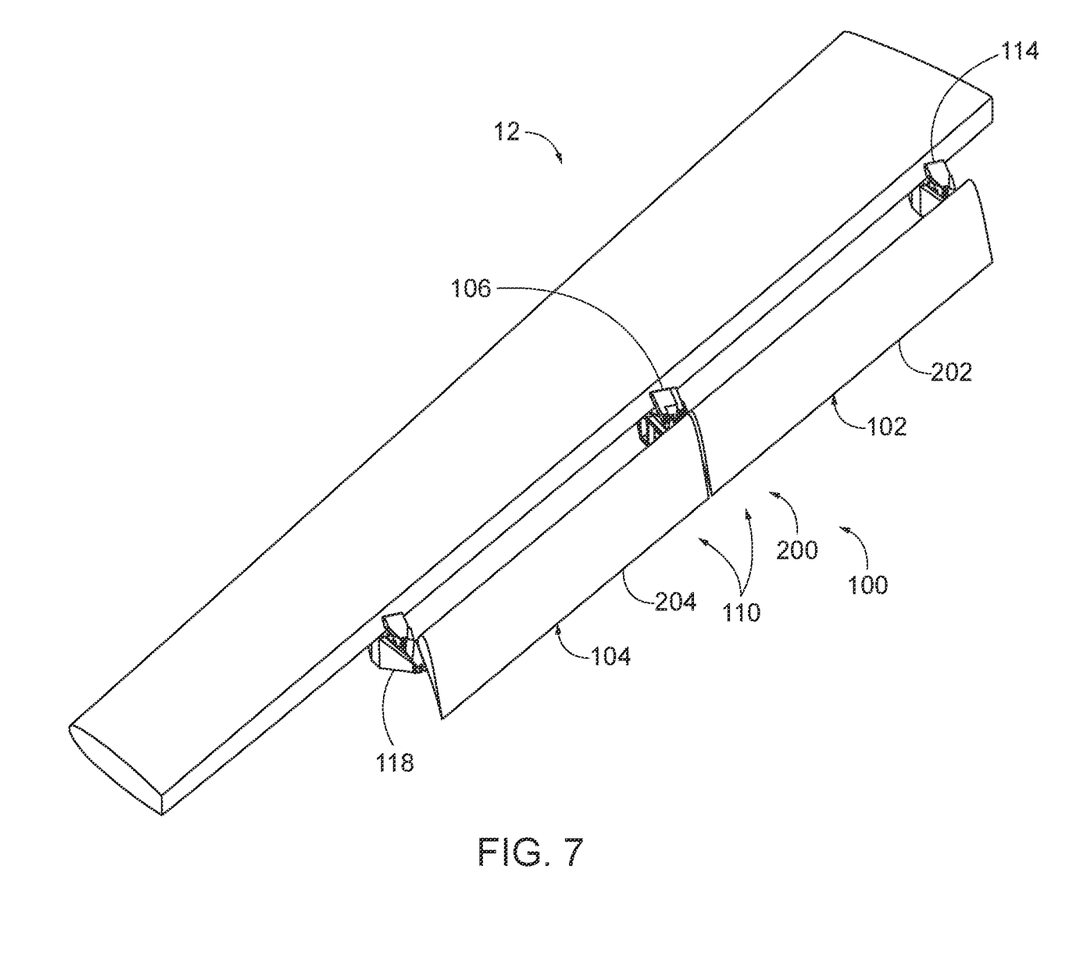
FIG. 7 is a perspective view of the wing assembly of FIG. 6 with the two flaps in an extended configuration.

As seen in FIGS. 6 and 7, wing assembly 200 is an example of a wing assembly 100 that includes an inboard flight control surface 102 in the form of an inboard flap 202, an outboard flight control surface 104 in the form of an outboard flap 204, a dual actuation assembly 106, an inboard actuation assembly 114, and an outboard actuation assembly 118. In FIG. 6, the flaps are illustrated in a retracted configuration 108, and in FIG. 7, the flaps are illustrated in an extended configuration 110.

Figure 8:
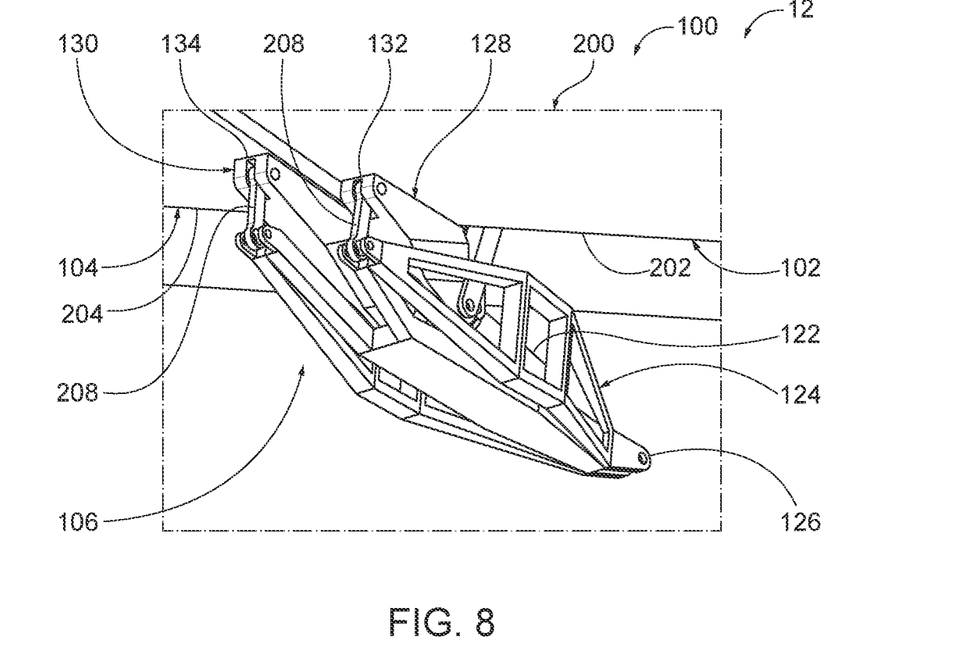
FIG. 8 is another perspective view of the wing assembly of FIG. 6, showing detail of the dual actuation assembly.
Figure 9:
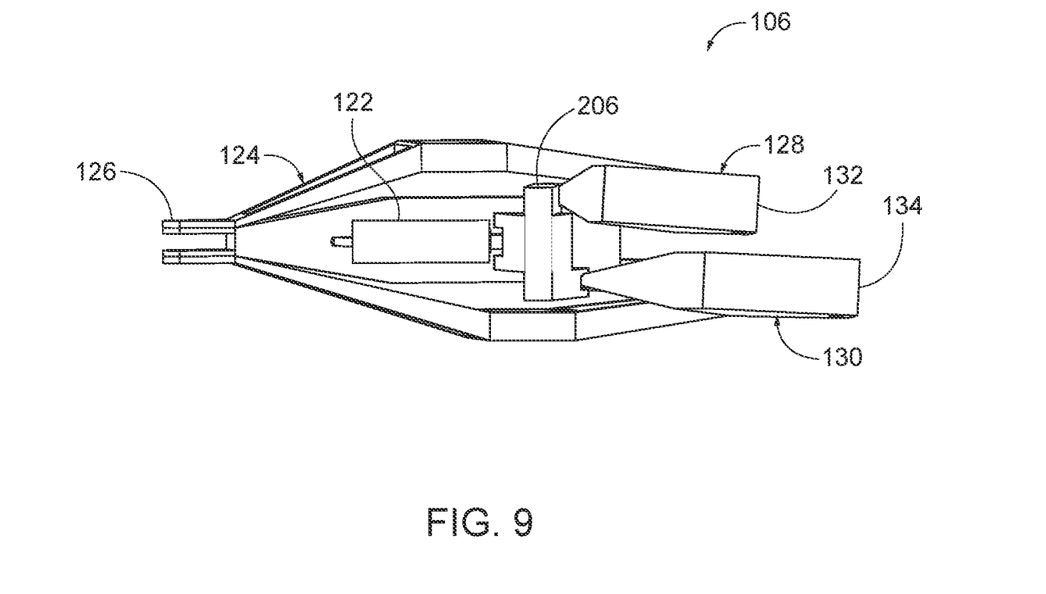
FIG. 9 is a top view of the wing assembly of FIG. 6, showing detail of the dual actuation assembly.

As best seen in FIGS. 8 and 9, the dual actuation assembly 106 of wing assembly 200 comprises a frame 124, a single actuator 122, an inboard carrier beam 128, an outboard carrier beam 130, and a drive arm 206 (FIG. 9). The frame 124 comprises a mount 126 that is configured to be operatively coupled to a wing support structure 22 (not illustrated), such as a rib. The single actuator 122 is coupled between the frame 124 and the drive arm 206, which in turn is coupled to the inboard carrier beam 128 and the outboard carrier beam 130, which in turn are coupled to the inboard flap 202 and the outboard flap 204, respectively. Because the drive arm 206 couples the single actuator 122 to the inboard carrier beam 128 and to the outboard carrier beam 130, the drive arm 206 may be described as a bifurcated drive arm. The inboard carrier beam 128 and the outboard carrier beam 130 also are coupled to the frame 124 via a pair of pivot links 208 (FIG. 8).

Illustrative, non-exclusive examples of inventive subject matter according to the present disclosure are described in the following enumerated paragraphs:

A. A wing assembly (100), comprising:
an inboard flight control surface (102);
an outboard flight control surface (104), positioned adjacent to and outboard of the inboard flight control surface (102); and a dual actuation assembly (106) coupled directly to and forming a linkage between the inboard flight control surface (102) and the outboard flight control surface (104);
wherein the dual actuation assembly (106) is configured to selectively transition the inboard flight control surface (102) and the outboard flight control surface (104), in tandem, amongst a retracted configuration (108) and a range of extended configurations (110).

A1. The wing assembly (100) of paragraph A, wherein the wing assembly (100) is configured such that the inboard flight control surface (102) and the outboard flight control surface (104) can only be actuated in tandem.

A2. The wing assembly (100) of any of paragraphs A-A1, further comprising:
a dual-actuation-assembly fairing (112) associated with the dual actuation assembly (106) and having a dual-actuation-assembly-fairing wetted area.

A3. The wing assembly (100) of any of paragraphs A-A2, wherein the dual actuation assembly (106) has a dual-actuation-assembly weight.

A4. The wing assembly (100) any of paragraphs A-A3, further comprising:
an inboard actuation assembly (114) coupled directly to the inboard flight control surface (102) and configured to selectively transition the inboard flight control surface (102) amongst the retracted configuration (108) and the range of extended configurations (110), in tandem, with the dual actuation assembly (106).

A4.1. The wing assembly (100) of paragraph A4 when depending from paragraph A2, further comprising:
an inboard-actuation-assembly fairing (116) associated with the inboard actuation assembly (114) and having an inboard-actuation-assembly-fairing wetted area that is less than the dual-actuation-assembly-fairing wetted area.

A4.1.1. The wing assembly (100) of paragraph A4.1, wherein the inboard-actuation-assembly-fairing wetted area is 60-90% of the dual-actuation-assembly-fairing wetted area.

A4.2. The wing assembly (100) of any of paragraphs A4-A4.1.1 when depending from paragraph A2, wherein the inboard actuation assembly (114) has an inboard-actuation-assembly weight that is less than the dual-actuation-assembly weight.

A4.2.1. The wing assembly (100) of paragraph A4.2, wherein the inboard-actuation-assembly weight is 60-90% of the dual-actuation-assembly weight.

A5. The wing assembly (100) of any of paragraphs A-A4.2.1, further comprising:
an outboard actuation assembly (118) coupled directly to the outboard flight control surface (104) and configured to selectively transition the outboard flight control surface (104) amongst the retracted configuration (108) and the range of extended configurations (110), in tandem, with the dual actuation assembly (106).

A5.1. The wing assembly (100) of paragraph A5 when depending from paragraph A4, wherein the outboard actuation assembly (118) is configured to selectively transition the outboard flight control surface (104) amongst the retracted configuration (108) and the range of extended configurations (110), in tandem, with the dual actuation assembly (106) and the inboard actuation assembly (114).

A5.2. The wing assembly (100) of any of paragraphs A5-A5.1 when depending from paragraph A1, further comprising:
an outboard-actuation-assembly fairing (120) associated with the outboard actuation assembly (118) and having an outboard-actuation-assembly-fairing wetted area that is less than the dual-actuation-assembly-fairing wetted area.

A5.2.1. The wing assembly (100) of paragraph A5.2, wherein the outboard-actuation-assembly-fairing wetted area is 60-90% of the dual-actuation-assembly-fairing wetted area.

A5.3. The wing assembly (100) of any of paragraphs A5-A5.2.1 when depending from paragraph A3, wherein the outboard actuation assembly (118) has an outboard-actuation-assembly weight that is less than the dual-actuation-assembly weight.

A5.3.1. The wing assembly (100) of paragraph A5.3, wherein the outboard-actuation-assembly weight is 60-90% of the dual-actuation-assembly weight.

A5.4. The wing assembly (100) of any of paragraphs A5-A5.3.1, wherein the inboard actuation assembly (114) and the outboard actuation assembly (118) are at least substantially identical in construction.

A6. The wing assembly (100) of any of paragraphs A-A5.4, wherein the inboard flight control surface (102) and the outboard flight control surface (104) are flaps (26).

A6.1. The wing assembly (100) of paragraph A6, wherein the inboard flight control surface (102) and the outboard flight control surface (104) are Krueger flaps.

A7. The wing assembly (100) of any of paragraphs A-A5.4, wherein the inboard flight control surface (102) and the outboard flight control surface (104) are slats (28).

A8. The wing assembly (100) of any of paragraphs A-A7, wherein the dual actuation assembly (106) comprises a single actuator (122).

A9. The wing assembly (100) of any of paragraphs A-A8, wherein the dual actuation assembly (106) comprises:
a frame (124) comprising a mount (126) coupled to a wing support structure (22);
a/the single actuator (122) supported by the frame (124);
an inboard carrier beam (128) pivotally coupled relative to the frame (124) and operatively coupled between the single actuator (122) and the inboard flight control surface (102); and
an outboard carrier beam (130) pivotally coupled relative to the frame (124) and operatively coupled between the single actuator (122) and the outboard flight control surface (104).

A9.1. The wing assembly (100) of paragraph A9, wherein the inboard carrier beam (128) has an inboard-carrier-beam distal end (132) and the outboard carrier beam (130) has an outboard-carrier-beam distal end (134), and wherein the outboard-carrier-beam distal end (132) is farther from the mount (126) than the inboard-carrier-beam distal end (132).

A9.2. The wing assembly (100) of any of paragraphs A9-A9.1, wherein the outboard carrier beam (130) is longer than the inboard carrier beam (128).

A10. An aircraft (10), comprising:
a fuselage (16); and
a wing (12) supported by the fuselage (16), wherein the wing (12) comprises the wing assembly (100) of any of paragraphs A-A9.2.

A11. The use of the wing assembly (100) of any of paragraphs A-A9.2 to move, in tandem, the inboard flight control surface (102) and the outboard flight control surface (104) to change aerodynamic characteristics of an aircraft (10).

B. A dual actuation assembly (106) for a wing assembly (100), the dual actuation assembly (106) comprising:
a frame (124) comprising a mount (126) configured to be coupled to a wing support structure (22);
a single actuator (122) supported by the frame (124);
an inboard carrier beam (128) pivotally coupled relative to the frame (124), operatively coupled to the single actuator (122), and configured to be operatively coupled to an inboard flight control surface (102) of the wing assembly (100); and an outboard carrier beam (130) pivotally coupled relative to the frame (124), operatively coupled to the single actuator (122), and configured to be operatively coupled to an outboard flight control surface (104) of the wing assembly (100);
wherein the single actuator (122) is configured to selectively transition the inboard carrier beam (128) and the outboard carrier beam (130), in tandem, amongst a retracted configuration (108) and a range of extended configurations (110).

B1. The dual actuation assembly (106) of paragraph B, wherein the inboard carrier beam (128) has an inboard-carrier-beam distal end (132) and the outboard carrier beam (130) has an outboard-carrier-beam distal end (134), and wherein the outboard-carrier-beam distal end (132) is farther from the mount (126) than the inboard-carrier-beam distal end (132).

C. A method of operating an aircraft (10), the method comprising:

with a dual actuation assembly (106) comprising a single actuator (122), transitioning an inboard flight control surface (102) and an outboard flight control surface (104), in tandem, amongst a retracted configuration (108) and a range of extended configurations (110).

C2. The method of paragraph C, wherein the aircraft (10) is the aircraft (10) of paragraph A10.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A wing assembly, comprising:
an inboard flight control surface;
an outboard flight control surface, positioned adjacent to and outboard of the inboard flight control surface; and
a dual actuation assembly coupled to and forming a linkage between the inboard flight control surface and the outboard flight control surface;
wherein the dual actuation assembly is configured to selectively transition the inboard flight control surface and the outboard flight control surface, in tandem, amongst a retracted configuration and a range of extended configurations, and
wherein the wing assembly is configured such that the inboard flight control surface and the outboard flight control surface can only be actuated in tandem.

2. The wing assembly of claim 1, further comprising:
a dual-actuation-assembly fairing associated with the dual actuation assembly and having a dual-actuation-assembly-fairing wetted area;
an inboard actuation assembly coupled directly to the inboard flight control surface and configured to selectively transition the inboard flight control surface amongst the retracted configuration and the range of extended configurations, in tandem, with the dual actuation assembly; and
an inboard-actuation-assembly fairing associated with the inboard actuation assembly and having an inboard-actuation-assembly-fairing wetted area that is less than the dual-actuation-assembly-fairing wetted area.

3. The wing assembly of claim 2, further comprising:
an outboard actuation assembly coupled directly to the outboard flight control surface and configured to selectively transition the outboard flight control surface amongst the retracted configuration and the range of extended configurations, in tandem, with the dual actuation assembly and the inboard actuation assembly; and
an outboard-actuation-assembly fairing associated with the outboard actuation assembly and having an outboard-actuation-assembly-fairing wetted area that is less than the dual-actuation-assembly-fairing wetted area.

4. The wing assembly of claim 3, wherein the inboard-actuation-assembly-fairing wetted area and the outboard-actuation-assembly-fairing wetted area are each 60-90% of the dual-actuation-assembly-fairing wetted area.

5. The wing assembly of claim 3, wherein the inboard actuation assembly and the outboard actuation assembly are at least substantially identical in construction.

6. The wing assembly of claim 1, wherein the dual actuation assembly has a dual-actuation-assembly weight and the wing assembly further comprises:
an inboard actuation assembly coupled directly to the inboard flight control surface and configured to selectively transition the inboard flight control surface amongst the retracted configuration and the range of extended configurations, in tandem, with the dual actuation assembly, wherein the inboard actuation assembly has an inboard-actuation-assembly weight that is less than the dual-actuation-assembly weight.

7. The wing assembly of claim 6, further comprising:
an outboard actuation assembly coupled directly to the outboard flight control surface and configured to selectively transition the outboard flight control surface amongst the retracted configuration and the range of extended configurations, in tandem, with the dual actuation assembly and the inboard actuation assembly, wherein the outboard actuation assembly has an outboard-actuation-assembly weight that is less than the dual-actuation-assembly weight.

8. The wing assembly of claim 7, wherein the inboard-actuation-assembly weight and the outboard-actuation-assembly weight are each 60-90% of the dual-actuation-assembly weight.

9. The wing assembly of claim 7, wherein the inboard actuation assembly and the outboard actuation assembly are at least substantially identical in construction.

10. The wing assembly of claim 1, wherein the inboard flight control surface and the outboard flight control surface are flaps.

11. The wing assembly of claim 10, wherein the inboard flight control surface and the outboard flight control surface are Krueger flaps.

12. The wing assembly of claim 1, wherein the inboard flight control surface and the outboard flight control surface are slats.

13. The wing assembly of claim 1, wherein the dual actuation assembly comprises a single actuator.

14. The wing assembly of claim 1, wherein the dual actuation assembly comprises:
- a frame comprising a mount configured to be coupled to a wing support structure;
- a single actuator supported by the frame;
- an inboard carrier beam pivotally coupled relative to the frame and operatively coupled between the single actuator and the inboard flight control surface; and
- an outboard carrier beam pivotally coupled relative to the frame and operatively coupled between the single actuator and the outboard flight control surface.

15. The wing assembly of claim 14, wherein the inboard carrier beam has an inboard-carrier-beam distal end and the outboard carrier beam has an outboard-carrier-beam distal end, and wherein the outboard-carrier-beam distal end is farther from the mount than the inboard-carrier-beam distal end.

16. The wing assembly of claim 14, wherein the outboard carrier beam is longer than the inboard carrier beam.

17. An aircraft, comprising:
- a fuselage; and
- a wing supported by the fuselage, wherein the wing comprises the wing assembly of claim 1.

18. A dual actuation assembly for a wing assembly, the dual actuation assembly comprising:
- a frame comprising a mount configured to be coupled to a wing support structure;
- a single actuator supported by the frame;
- an inboard carrier beam pivotally coupled relative to the frame, operatively coupled to the single actuator, and configured to be operatively coupled to an inboard flight control surface of the wing assembly; and
- an outboard carrier beam pivotally coupled relative to the frame, operatively coupled to the single actuator, and configured to be operatively coupled to an outboard flight control surface of the wing assembly;
- wherein the single actuator is configured to selectively transition the inboard carrier beam and the outboard carrier beam, in tandem, amongst a retracted configuration and a range of extended configurations.

19. A method of operating an aircraft, the method comprising:
- with a dual actuation assembly comprising a single actuator, transitioning an inboard flight control surface and an outboard flight control surface, in tandem, amongst a retracted configuration and a range of extended configurations, wherein the dual actuation assembly is configured to only transition the inboard flight control surface and the outboard flight control surface in tandem.

20. A wing assembly, comprising:
- an inboard flight control surface;
- an outboard flight control surface, positioned adjacent to and outboard of the inboard flight control surface;
- a dual actuation assembly coupled to and forming a linkage between the inboard flight control surface and the outboard flight control surface, wherein the dual actuation assembly is configured to selectively transition the inboard flight control surface and the outboard flight control surface, in tandem, amongst a retracted configuration and a range of extended configurations;
- a dual-actuation-assembly fairing associated with the dual actuation assembly and having a dual-actuation-assembly-fairing wetted area;
- an inboard actuation assembly coupled directly to the inboard flight control surface and configured to selectively transition the inboard flight control surface amongst the retracted configuration and the range of extended configurations, in tandem, with the dual actuation assembly; and
- an inboard-actuation-assembly fairing associated with the inboard actuation assembly and having an inboard-actuation-assembly-fairing wetted area that is less than the dual-actuation-assembly-fairing wetted area.

21. A wing assembly, comprising:
- an inboard flight control surface;
- an outboard flight control surface, positioned adjacent to and outboard of the inboard flight control surface;
- a dual actuation assembly coupled to and forming a linkage between the inboard flight control surface and the outboard flight control surface, wherein the dual actuation assembly is configured to selectively transition the inboard flight control surface and the outboard flight control surface, in tandem, amongst a retracted configuration and a range of extended configurations, and wherein the dual actuation assembly has a dual-actuation-assembly weight; and
- an inboard actuation assembly coupled directly to the inboard flight control surface and configured to selectively transition the inboard flight control surface amongst the retracted configuration and the range of extended configurations, in tandem, with the dual actuation assembly, wherein the inboard actuation assembly has an inboard-actuation-assembly weight that is less than the dual-actuation-assembly weight.

22. A wing assembly, comprising:
- an inboard flight control surface;
- an outboard flight control surface, positioned adjacent to and outboard of the inboard flight control surface; and
- a dual actuation assembly coupled to and forming a linkage between the inboard flight control surface and the outboard flight control surface, wherein the dual actuation assembly is configured to selectively transition the inboard flight control surface and the outboard flight control surface, in tandem, amongst a retracted configuration and a range of extended configurations, and wherein the dual actuation assembly comprises:
  - a frame comprising a mount configured to be coupled to a wing support structure;
  - a single actuator supported by the frame;
  - an inboard carrier beam pivotally coupled relative to the frame and operatively coupled between the single actuator and the inboard flight control surface; and
  - an outboard carrier beam pivotally coupled relative to the frame and operatively coupled between the single actuator and the outboard flight control surface.

* * * * *